United States Patent [11] 3,552,671

[72] Inventor Robert E. Wood
Ann Arbor, Mich.
[21] Appl. No. 802,776
[22] Filed Feb. 27, 1969
[45] Patented Jan. 5, 1971
[73] Assignee Sycor Inc.
Ann Arbor, Mich.
a corporation of Delaware

[54] DRIVE SPINDLE FOR TAPE REELS
18 Claims, 5 Drawing Figs.

[52] U.S. Cl. .......... 242/68.3
[51] Int. Cl. .......... B65h 17/02
[50] Field of Search .......... 242/68.3, 201, 71.2

[56] References Cited
UNITED STATES PATENTS
3,236,468 2/1966 Foret .......... 242/68.3X
FOREIGN PATENTS
449,407 4/1968 Switzerland .......... 242/68.3

*Primary Examiner*—Nathan L. Mintz
*Attorney*—Price, Heneveld, Huizenga & Cooper

ABSTRACT: A drive spindle, particularly for internally ridged or toothed winding reels and the like, generally comprising an elongated shaftlike member, and characterized by a reel-engaging end having a rounded triangular cross section at any plane transversely intersecting its axis, and with a longitudinally tapered configuration, with camlike side surfaces converging at such end.

INVENTOR.
ROBERT E. WOOD
BY Price, Heneveld, Huizenga & Cooper
ATTORNEYS

DRIVE SPINDLE FOR TAPE REELS

BACKGROUND

In my copending applications Ser. Nos. 795,415 and 792,281, the concept is set forth using the standard, commercial cassette-type magnetic tape cartridge in data processing and handling applications, as opposed to its standard usage in audio recording and reproducing, primarily for purposes of entertainment.

The general advantages of tape magazines, and particularly of cassette-type magazines, have now become well recognized in connection with storage and handling, since they overcome the many disadvantages of open tape reels, which expose the tape to the abuse and damage normally incident to physical handling. Also, all problems associated with threading tape from one reel to another are eliminated. Although these general advantages are appreciated and enjoyed in audio recording, however, the application of tape magazines, particularly those of the cassette type, to the data processing field in order to take advantage of such qualities is quite another matter. Actually, the cassettes are not adapted, either by design or manufacture, to fulfill the much more demanding requirements of data-handling applications and, while their performance in audio recording environments is entirely satisfactory, their direct adaptation into data-handling applications cannot be expected to produce acceptable performance and is an unfeasible idea.

For example, in data-handling applications binary-type information is recorded in long trains of clocked pulses of very brief duration, and both the recording and reproducing of such information demands extremely accurate and precise tape drive control, far exceeding the normal requirements of audio recording. The recording tape enclosed within the cassette is secured at its ends to winding spool or reel elements which are rather loosely mounted between the cassette walls and which have radially inwardly directed teeth or ridges accessible through the top and bottom of the cassette, so that takeup drive spindles which loosely engage the spools may be used to rotate them and take up slack tape moved past the tape head for recording and reproducing purposes by a capstan and pinch-roller drive mechanism. In this situation, the performance of the takeup spindles is not in any sense critical to the operation of the recorder, since the tape velocity is determined by the capstan drive, and slippage and play between the takeup spindle and the winding spool is not an important matter, as is also true of other variable factors such as winding spool rotational eccentricity and the like.

In data-handling applications of the cassette-type magazine, tape speed regulation and overall drive smoothness are of paramount importance and the nature and performance of the drive mechanism which is utilized is therefore of great concern. In my aforementioned copending application Ser. No. 795,415, I have disclosed a drive train eminently suitable for this application, in which a pair of drive spindles are used to drive the tape within the cassette by engaging the winding spools, instead of using a conventional capstan and pinch roller-type drive. The configuration of such drive spindles at their top, where they engage the cassette winding spools, is a matter of considerable importance, since it is at this point in the drive system that factors affecting tape speed regulation and uniformity are introduced which cannot be eliminated by the performance capabilities of the drive train itself.

For example, the cassette-winding spools are relatively loosely retained, contributing to spool centering and winding eccentricity problems; further, the engagement teeth of the winding spools are not made with precision and are likely to have length variations as well as at least small surface irregularities, which also contribute to eccentricity and centering problems. Further, the spools and their engagement teeth are normally made of plastic, and overall size variations resulting from relatively lenient production tolerances contribute to strength variations in the teeth, by which different degrees of bending may result when torque is applied to the teeth to drive the tape.

SUMMARY OF THE INVENTION

The present invention provides a drive spindle particularly adapted to solve the aforementioned and other similar problems involved in driving cassette-type tape cartridges through their takeup spools or reels. The spindle of the invention has a novel and unusual configuration which provides excellent spool-centering characteristics between cassettes whose spool teeth vary randomly in size and shape, and provides excellent drive characteristics regardless of all such customary variations.

Briefly stated, the drive spindle of the invention comprises a shaftlike member with a tapered end extremity, having ridge-forming portions on its outer periphery extending radially outwardly substantially the same distance from the axis of the shaft, and also tapering toward such end, and further having curved cam surfaces between the ridge-forming means, circumferentially bridging the same along a substantial portion of their tapering length.

IN THE DRAWINGS

PREFERRED EMBODIMENT

Figure 1:
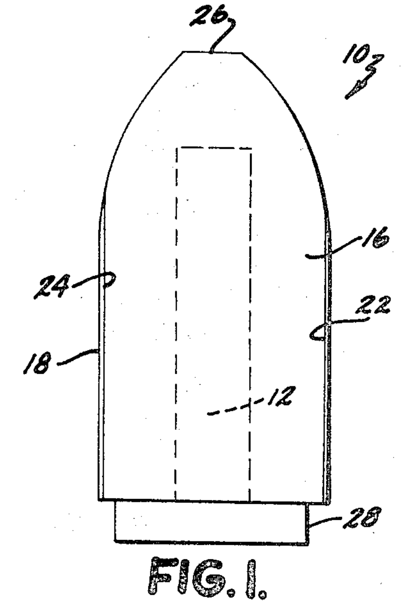
FIG. 1 is a side elevation of a drive spindle according to the invention, on an enlarged scale.

Referring now in detail to the FIGS., the drive spindle 10 of the invention in its most preferred embodiment comprises a cap or tip extension for a driving shaft, although it is to be understood that in the broader 43 of the invention the spindle configuration may be integral with the driving shaft itself. In the preferred embodiment, the spindle 10 is a somewhat elongated shaftlike member having an axial internal recess or passage 12 for receiving the end extremity of the aforementioned driving shaft, by which the spindle is mounted to such shaft for rotation thereby. In overall cross section, the spindle 10 is of rounded triangular shape FIGS. 2 and 4), having circumferentially curved side cam surfaces 14, 16, and 18 which intersect to form longitudinally-extending ridgelike portions or edges 20, 22 and 24. The spindle 10 may be truncated at its top, having a flat upper end extremity 26. Also, the spindle 10 may have a cylindrical base portion 28 (FIG. 1), which can serve as a journal for the spindle, received within an appropriate circular bearing.

As illustrated in FIG. 1, the side edges or ridges 20, 22 and 24 of the drive spindle are essentially parallel to the axis of the spindle over the lower extremities thereof; however, along a substantial portion of the length of the spindle, at what will be referred to for convenience as the upper end extremity thereof, the side edges converge along a curving path which is basically circular for each such edge, each such curve having its own center of curvature. The side surfaces 14, 16 and 18 also converge in a somewhat similar curving manner, such that the drive spindle is tapered at its upper extremity.

Figures 2, 4:
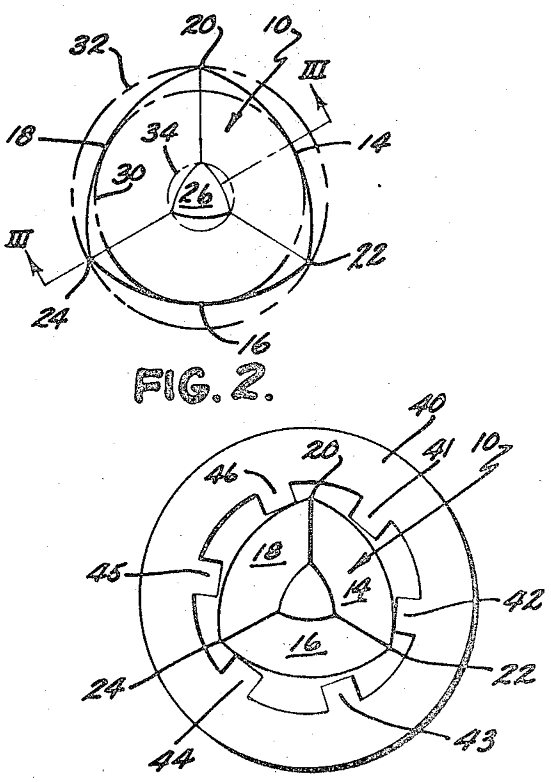
FIG. 2 is an overhead plan view of the spindle shown in FIG. 1.
FIG. 4 is an overhead plan view on a slightly reduced scale showing the drive spindle engaged within the winding spool.
Figure 3:
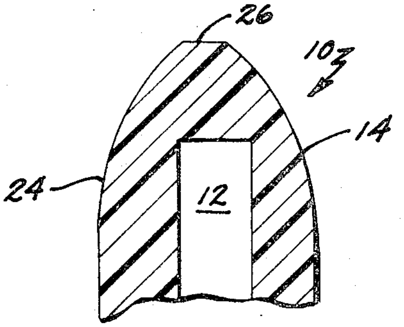
FIG. 3 is a sectional side elevation of the spindle, taken along the plane III–III of FIG. 2.

The side surfaces 14, 16 and 18 are each of circular shape in each of an infinite number of theoretical planes perpendicularly intersecting the axis of the spindle (FIGS. 2 and 4). The radius of curvature in each such plane is the same for each and varies over the tapered portion of the spindle; however, for each surface the center of curvature will fall on a radially extending line from the axis of the spindle which bisects the ridgelike portion disposed opposite the side surface being considered. The radius of curvature for the surfaces is greater than the outward extension of the ridge portions, however, and consequently the centers of curvature for the side surfaces fall on points in space beyond the silhouette of the spindle itself, in any plane of intersection. As stated, the radius of curvature for the different side surfaces is the same in any theoretical plane of intersection, such that the center portion of the different side surfaces in any such plane will all fall on a circle drawn about the axis of the spindle as a center, such as the phantom line indicated at 30 in FIG. 2. Similarly, the radial extension of each of the ridgelike portions 20, 22 and 24 is equal in each theoretical plane of intersection, such that the outermost extremity of each such ridge portion in each plane of intersection falls on a circular locus such as that designated 32 in FIG. 2, also having the axis of the spindle as a center. In similar fashion, the end points of the triangularly shaped flat upper end extremity 26 fall on another circular locus, drawn in phantom and designated 34 (FIG. 2).

From the foregoing, it will be seen that the side surfaces 14, 16 and 18 of the drive spindle are double-curved over the tapered portion of the spindle, being circular in their circumferential excursion between adjacent ridge portions, and being longitudinally curved along the length of the spindle. With this configuration, the side surfaces actually form cam surfaces, designed to cooperate with and engage the takeup spools of the tape cassette with which the spindle is designed to operate.

Figure 5:
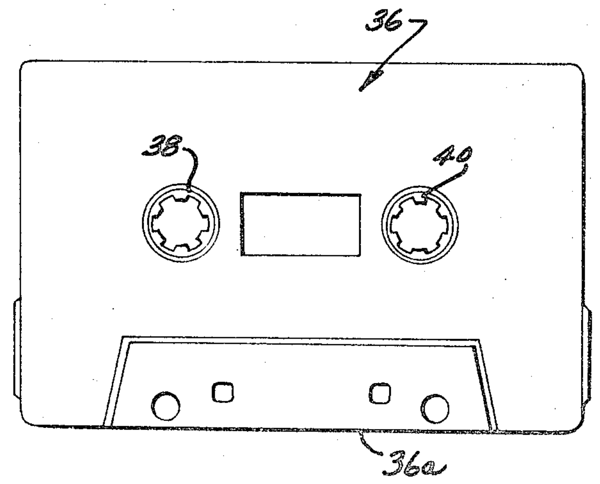
FIG. 5 is an overhead plan view of the cassette-type magazine with which the drive spindle is used.

The magnetic tape cassette referred to hereinabove is graphically shown in FIG. 5, designated by the numeral 36. As has been stated, this is a conventional piece of equipment widely available from commercial sources in direct consumer sales. While the complete nature of the cassette is therefore readily ascertainable, it may be noted here for purposes of a complete understanding of the invention that the cassette 36 basically comprises a flat rectangular enclosure housing a certain length of magnetic recording tape wound upon a pair of internal spools having hubs 38 and 40 accessible through the top and bottom of the cassette. Each such hub has radially inwardly directed toothlike projections which provide engagement elements for rotation of the spools. In this manner, the tape enclosed within the cassette may be reeled from one such spool to the other, and is guided for movement past a front face **36*a*** of the cassette, where the tape is accessible through appropriate apertures to a tape head for recording and reproducing purposes.

The drive spindle 10 of the invention is designed for engagement of the cassette spool hubs 38 and 40, in the manner illustrated in FIG. 4, where the hub 40 is shown for illustration. From this FIG. it will be noted that the hub conventionally has six of the aforementioned inwardly directed engagement teeth, which are designated 41, 42, 43, 44, 45 and 46. Normally, these are in the form of cylindrical projections, but they could be practically any ridgelike projection of similar basic nature.

As illustrated, the drive spindle 10 of the invention is configured such that the ridgelike portions 20, 22 and 24 thereof fit between adjacent pairs of the tooth projections just identified when the cassette is placed in position on the tape deck of which the drive spindle is a part, with the hubs 38 and 40 telescoped over a spaced pair of the drive spindles. In this relation, each of the cam surfaces 14, 16 and 18 on the sides of each drive spindle engage at least one of the two such cassette spool teeth as the cassette is seated over the drive spindles.

This relationship is such that, due to the spacially curved configuration of the cam surfaces, the latter provide a centering function for the spool, which is loosely retained within the cassette itself. Also, incremental length variations between the various spool teeth are readily accommodated by the shape of the cam surfaces, since their shape will cause the spool to be rotated as the cassette is mounted over the drive spindles an amount sufficient to bring about the centered driving relationship illustrated in FIG. 4. As may be appreciated, if the spool teeth projections are sufficiently long, each may actually be placed in engagement with one or the other of the drive spindle cam surfaces, in which event the edges or ridge projections 20, 22, 24 of the spindle will be positioned midway between the two teeth in the appropriate pair between which such ridge projection is disposed. With progressively shorter spool teeth, the spindle ridges become located increasingly closer to one of the teeth in such pair, i.e., the one such tooth which the side cam surfaces of the spindle will engage and drive.

In accordance with the foregoing, it will be seen that the drive spindle of the invention is designed so that the spool teeth can never be so short that they will completely clear the ridge projections on the drive spindle to produce a complete absence of driving engagement between the spindle and the spool, nor will the teeth projections ever be so long that they prevent entry of the spindle into the open center of the spool hub. As indicated above, any point along the tapered excursion of the spindle may be utilized to drive the spool if this is necessary, and for this purpose a slideable interfit may be provided between the spindle and the shaft entering its central passage 12, and the spindle may be spring-loaded with respect to the drive shaft entering such passage, so as to be yieldable downwardly.

It is entirely conceivable that upon examining the foregoing disclosure, those skilled in the art may devise particular embodiments of the concepts forming the basis of the invention which differ somewhat from the preferred embodiment shown and described herein, or may make various changes in structural details to the present embodiment. Consequently, it is to be recognized that the preferred embodiment shown and described is for purposes of general illustration only and is in no way intended to illustrate all possible forms of the invention.

I claim:

1. A drive spindle for internally ridged winding reels, comprising: a shaft member; at least two ridge-forming portions on the outer periphery of said member, each extending radially outward substantially the same distance from the axis thereof; and curved cam surfaces extending between and circumferentially bridging said ridge portions along a substantial portion of their length.

2. The drive spindle of claim 1, wherein said shaft member is tapered along at least a portion of its length to form an insertion end of reduced diametral proportions.

3. The drive spindle of claim 2, wherein said shaft member is tapered along a curve.

4. The drive spindle of claim 1, wherein said ridge portions converge toward one end of said shaft member.

5. The drive spindle of claim 4, wherein said ridge portions follow a curve as they converge.

6. The drive spindle of claim 1, wherein said cam surfaces are circumferentially curved between said ridge portions.

7. The drive spindle of claim 6, wherein each of said cam surfaces is curved along a substantially constant radius in a plane transversely intersecting said shaft, said cam surfaces each being circumferentially circular in cross section.

8. The drive spindle of claim 7, wherein the radius of curvature of said cam surfaces is greater than the radially outward projection of said ridge portions from the axis of said shaft at corresponding points along the length of the shaft.

9. The drive spindle of claim 7, wherein the curvature of said cam surfaces is such that each has a different center of curvature.

10. The drive spindle of claim 6, wherein said shaft member is tapered along at least a portion of its length to form an insertion end of reduced diametral proportions.

11. The drive spindle of claim 6, wherein said cam surfaces are double-curved at least in part, each having said circumferential curve and also having a longitudinal curve in a plane intersecting the axis of said shaft along its length.

12. The drive spindle of claim 11, wherein said cam surfaces are mutually convergent along the length of said shaft and form a shaft end extremity of reduced diametral proportions.

13. The drive spindle of claim 12, wherein said ridge portions are mutually convergent along said shaft and toward the said end extremity thereof.

14. The drive spindle of claim 13, wherein each of said cam surfaces is curved along a substantially constant radius in a plane transversely intersecting said shaft, said cam surfaces each being circumferentially circular in cross section.

15. The drive spindle of claim 14, wherein the radius of curvature of said cam surfaces is greater than the radially outward projection of said ridge portions from the axis of said shaft at corresponding points along the length of the shaft.

16. The drive spindle of claim 15, including at least three of said ridge-forming portions, each equidistant from the two laterally closest to it around the circumferential periphery of said shaft.

17. A drive spindle for internally ridged winding reels, comprising: a shaft member; at least three ridge-forming portions on the outer periphery of said member, each extending radially outward substantially the same distance from the axis of said shaft; and cam surfaces extending between and circumferentially bridging said ridge portions along a substantial portion of their length; said cam surfaces being mutually convergent along at least a portion of the length of said shaft means, in a direction toward a free end thereof.

18. In combination: a cassette-type magnetic tape cartridge having internally ridged winding spool means, and a drive spindle for insertion into and rotation of such spool means; said drive spindle having a plurality of adjacent axially elongated side surfaces which converge circumferentially to form spaced longitudinal ridges on said spindle and which converge longitudinally to taper said spindle; said ridges having a size and being spaced such that they fit between certain adjacent pairs of said spool means ridges; and said side surfaces having a size and shape such that they contact at least portions of the spool means ridges between which said spindle ridges fit, such that said spindle when inserted through said cassette spool means will drive the same rotationally by the contacting spool means ridges and spindle side surfaces.